United States Patent
McWhirter (10) Patent No.: US 9,268,962 B1
(45) Date of Patent: Feb. 23, 2016

(54) ACCESS REVOCATION

(71) Applicant: Bank of America Corporation, Charlotte, NC (US)

(72) Inventor: Stephen J. McWhirter, Hamilton, MA (US)

(73) Assignee: Bank of America Corporation, Charlotte, NC (US)

( * ) Notice: Subject to any disclaimer, the term of this patent is extended or adjusted under 35 U.S.C. 154(b) by 4 days.

(21) Appl. No.: 14/479,577

(22) Filed: Sep. 8, 2014

(51) Int. Cl.
*G06F 21/62* (2013.01)
*G06Q 10/06* (2012.01)

(52) U.S. Cl.
CPC ............ *G06F 21/6218* (2013.01); *G06Q 10/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,437,551 | B2 * | 10/2008 | Chan ..................... | H04L 9/3268 713/158 |
| 7,543,140 | B2 * | 6/2009 | Dillaway ................ | G06F 21/10 713/156 |
| 2006/0089126 | A1 * | 4/2006 | Frank ...................... | H04L 63/08 455/411 |
| 2012/0042390 | A1 * | 2/2012 | Iwuchukwu ............ | H04L 63/10 726/27 |
| 2012/0221695 | A1 * | 8/2012 | Rose .................. | G07C 9/00103 709/223 |
| 2012/0231817 | A1 * | 9/2012 | Holm ................. | G01C 21/3629 455/456.3 |
| 2013/0174214 | A1 * | 7/2013 | Duncan ............... | G06F 11/3065 726/1 |

\* cited by examiner

*Primary Examiner* — Beemnet Dada
(74) *Attorney, Agent, or Firm* — Banner & Witcoff, Ltd.; Michael A. Springs (57) ABSTRACT

Systems, methods and apparatuses for revoking access to one or more applications for one or more individuals or users are provided. In some examples, revocation settings may be received from different business divisions or enterprises or business groups within an entity and may be compiled to form a standardized set of revocation settings that may be applied across the entity. Accordingly, upon receiving an item that may be associated with access and may include one or more applications to which access may be revoked and/or one or more users from which access may be revoked, the system may apply the standardized revocation settings to determine whether access should be revoked. If it is determined that access should be revoked, the system may revoke access to the one or more applications for the one or more users.

20 Claims, 6 Drawing Sheets

| ITEM ID | DATE/TIME | ACCESS? | ACTIONABLE? | MAPPED? | ACCESS REVOKED? |
|---|---|---|---|---|---|
| ITEM 1 | XX/XX/XXXX YY:YY | YES | NO | NO | NO |
| ITEM 2 | XX/XX/XXXX YY:YY | YES | YES | YES | YES |
| ITEM 3 | XX/XX/XXXX YY:YY | NO | NO | NO | NO |
| ITEM 4 | XX/XX/XXXX YY:YY | YES | YES | YES | YES |
| ITEM 5 | XX/XX/XXXX YY:YY | YES | NO | NO | NO |
| ITEM 6 | XX/XX/XXXX YY:YY | YES | | | |

ACCESS REVOCATION

BACKGROUND

Companies often implement a plurality of different applications in the day-to-day functioning of the company. Providing access to those applications and associated data is an important business function. Although providing access is important in order to enable employees to successfully perform different work functions, revoking access upon termination of an employee, or other job change of an employee, is also an important function. Often, when employees leave a position, notifications are sent to various business groups, such as an information technology group, who may then revoke access to the one or more applications to which the user had access. However, in some situations, there can be significant delays in informing the various business groups, which can leave the company exposed to risk from former employees or other individuals who no longer need access to one or more applications, but still are able to access those applications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for revoking access to one or more applications for one or more individuals or users. In some examples, revocation settings may be received from various different business divisions or enterprises or business groups within an entity. The settings may be compiled to form a standardized set of revocation settings that may be applied across the entity. Accordingly, upon receiving an item that may be associated with access and, in some examples, may include one or more applications to which access may be revoked and/or one or more users from which access may be revoked, the system may apply the standardized revocation settings to determine whether access should be revoked. In some examples, the determination may be made automatically upon receiving the item. If it is determined that access should be revoked, the system may revoke access to the one or more applications for the one or more users. In some examples, access revocation may be performed automatically upon determining that access should be revoked.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Companies often have a plurality of applications which one or more users, such as employees, contractors, and the like, access during a work day to perform various work functions. Access to these applications, as well as data contained therein, may be restricted to users who have a need to access the application or information (e.g., their job or role requires access to the application to perform a work function, and the like). Accordingly, when a user who currently has access leaves his or her job or position (e.g., if the employee is terminated, contract period ends, employee leaves the current position for another position within the same entity, or the like) access that was being provided to that user must be evaluated and, as needed, revoked (e.g., if the user is no longer employed by the entity, new position does not include access to the application, or the like). In some examples, revocation of access may include removing the user (e.g., by name, employee number, or other unique identifier) from a listing or database of users having access to the identified application.

Aspects described herein relate to an access revocation system that may, in some examples, automatically determine whether access to one or more applications for one or more users should be revoked and, in some examples, may automatically revoke access. In some arrangements, applications in use in the entity may be inventoried to determine appropriate users for access, and the like. Further, data may be received from various sources, such as human resources, regarding the employment status of one or more users.

Further, access revocation settings from various different enterprises, business groups, business divisions or the like, within the entity, may be received and compiled. These settings may be automatically applied to an item received (e.g., a data element identifying one or more applications and/or one or more users for which access may be revoked) in order to determine, for instance, whether the item relates to access, whether the item is actionable, and/or whether the item is mapped to a confirmed location, or the like. Based on these determinations, the system may automatically revoke access to the one or more applications for the one or more users. These and various other aspects will be discussed more fully below.

Figure 1:
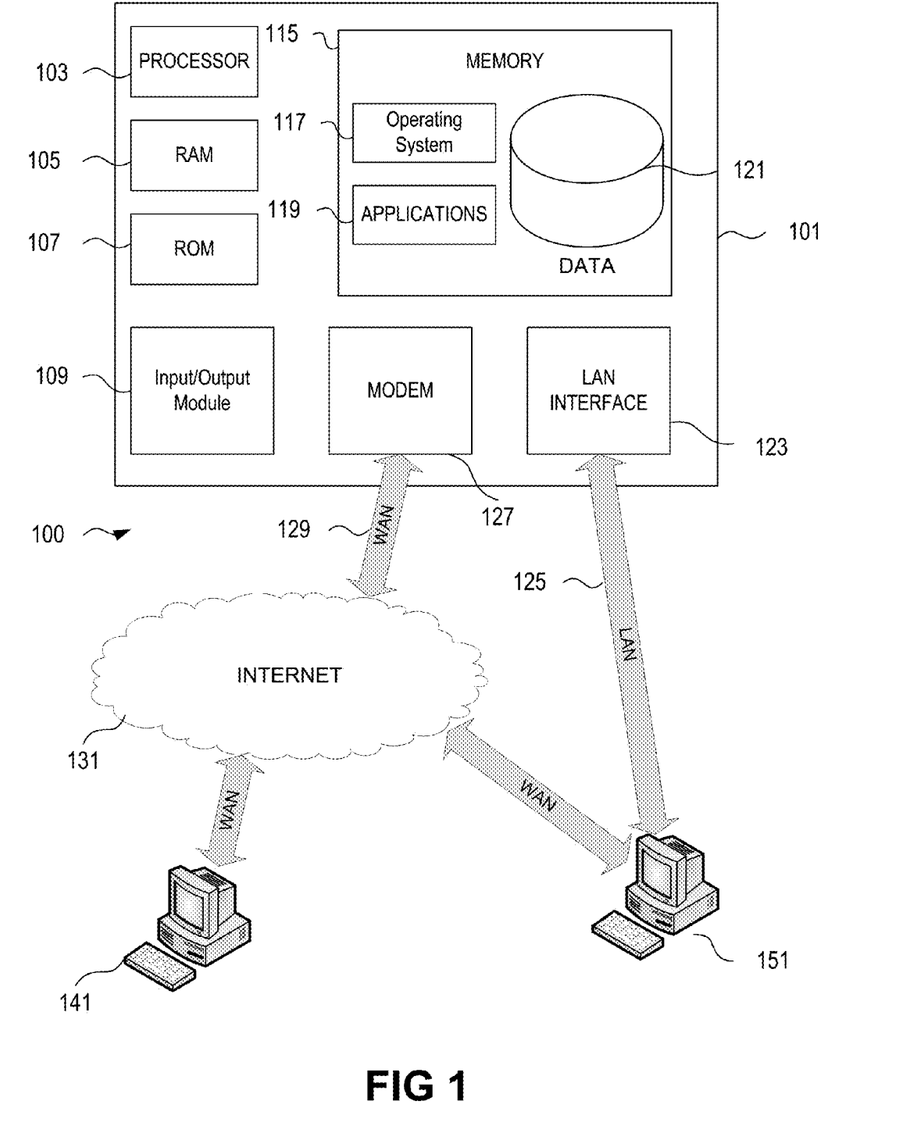
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP), hypertext transfer protocol secure (HTTPS), and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
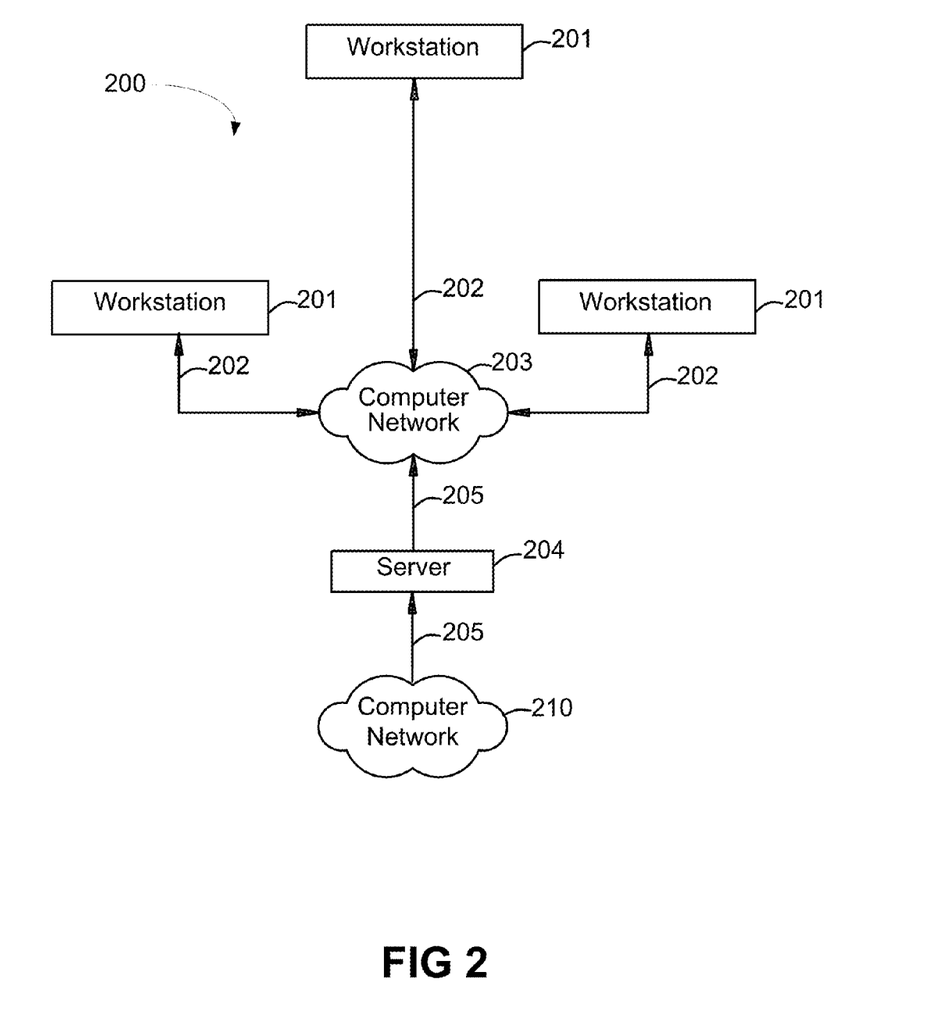
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
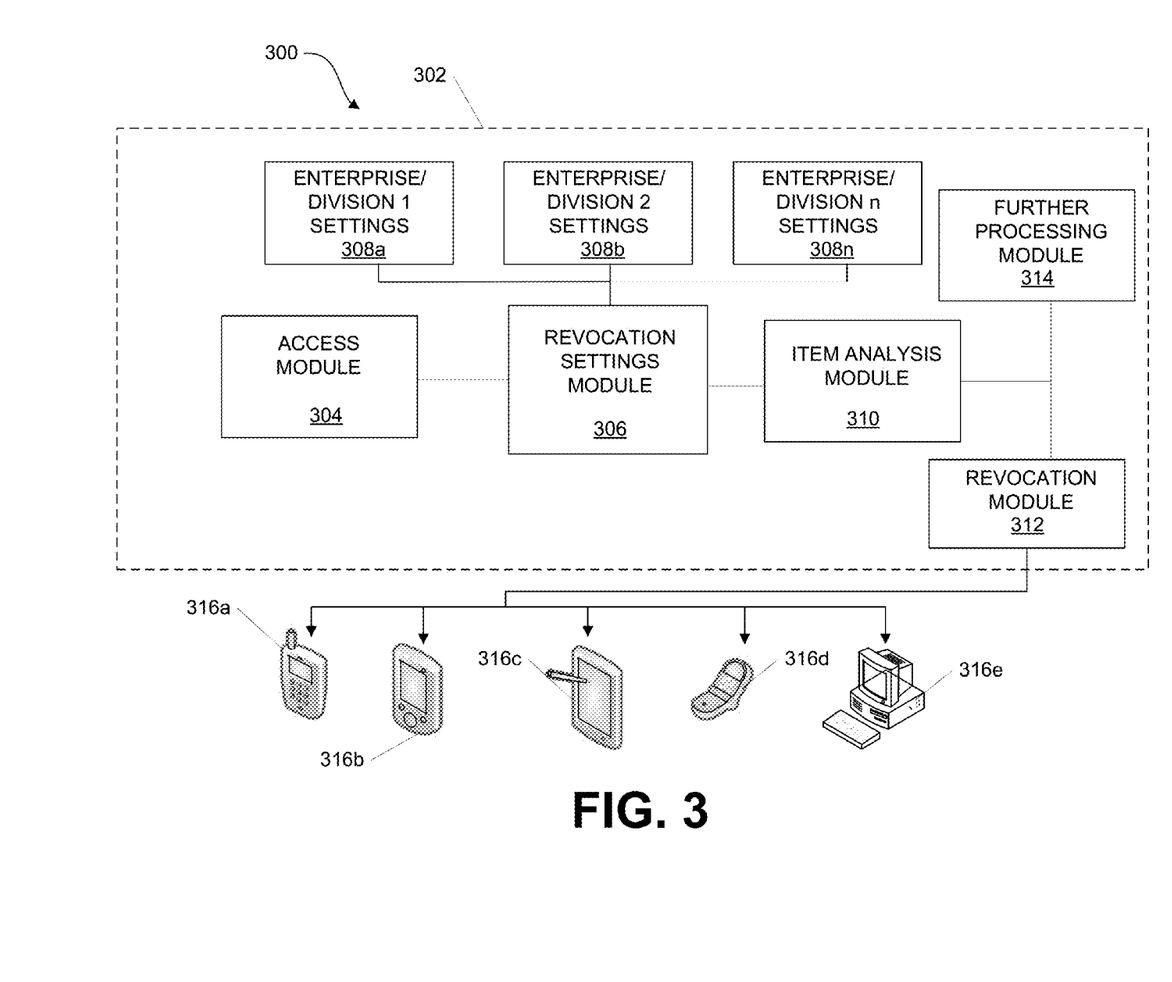
FIG. 3 illustrates an example access revocation system according to one or more aspects described herein.

FIG. 3 illustrates one example access revocation system 300 according to one or more aspects described herein. In some examples, the access revocation system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the access revocation system 300 to use within a financial institution. Rather, the system may be implemented by various other types of entities.

The access revocation system 300 may include one or more modules that may include hardware and/or software configured to perform various functions within the system 300. In some examples, one or more modules within system 300 may be in physically separate devices. In other examples, one or more modules within system 300 may be formed in a single physical device or unit.

For instance, the access revocation system 300 may include an access module 304. The access module 304 may include one or more databases storing information associated with various applications, as well as information associated with individuals permitted to access one or more of the various applications. For instance, the entity 302 may implement one or more applications during the course of business. Applications may include, for example, email or messaging applications, word processing applications, data or file storage applications, and the like. Various users associated with the entity 302 (e.g., employees of the entity, contractors working within the entity, or the like) may be granted permission to access one or more of the applications. The permissions may be stored (in various arrangements, formats, or the like), for example, in the access module 304. For instance, access module 304 may include a listing of employees (by name, employee number or other identifier, or the like). Associated with each employee may be a list of applications to which the employee has access or permission to access. Should the employee terminate their employment, access or permission to access those applications may be revoked, as will be discussed herein.

The access module 304 may further include information or data associated with a status of each user. For instance, human resources or other records may be used to identify a work status of a user (e.g., employed by the entity, terminated, or the like). In some examples, a role or job position, including particular duties associated with the role or job position may be stored. Thus, as a user moves from one position within the entity to another, the appropriate permissions to access one or more applications may be modified and/or stored within the access module 304.

Data associated with applications, users, human resources, and the like, stored or used by the access module 304 may be received from one or more sources, such as databases (not shown in FIG. 3). The one or more sources may be internal to (e.g., associated with) the entity 302, or may be external to (e.g., not associated with) the entity 302.

The access revocation system 300 may further include a revocation setting module 306. The revocation settings module 306 may receive one or more access review process settings, such as from different business divisions or enterprises within the entity 302. For example, settings from enterprise or division 1 308a, enterprise or division 2 308b through enterprise or division n 308n may be received by the revocation settings module 306. The access review process settings received may include, in at least some examples, settings determined to be best practices of each enterprise or division. In some examples, the settings received may be from different types of groups. For instance, some settings may be received from an enterprise while some settings may be received from a division (e.g., a division within the enterprise, or the like), business group, or the like. Thus, the settings received may be compiled by the revocation settings module 306 and applied to items received in order to filter out items associated with access, that are actionable, that are properly mapped, or the like, based on the settings. The compiled settings may be a standardized set of revocation settings that may be applied across the entity 302, as desired.

The access revocation system 300 may further include an item analysis module 310. The item analysis module 310 may receive one or more items (such as items that appear to be associated with access, access revocation, or the like) and may automatically apply the compiled revocation settings from the revocation settings module 306 to determine whether the items are associated with access (e.g., to an application, data or the like), whether they are actionable (e.g., whether the appropriate system has received the item, whether an appropriate team is analyzing the item, or the like), and/or whether they are mapped to a confirmed location. In some examples, mapping to a confirmed location includes mapping of an application reference number to, for example, an access administrator, to a simplified sign-on (SSO) owner (e.g., for applications with web enabled access), a division or enterprise access management team, an access management team from a division or enterprise outside the division or enterprise related to the item, and/or the access administrator for profiled access. Various other filters or criteria may be applied to items received based on the revocation settings without departing from the invention.

In some examples, the received one or more items may include an identified one or more applications, an identified one or more users, and the like. Accordingly, the system 300 and, in particular, the item analysis module 310, may determine whether access to or permission to access the identified one or more applications should be revoked for the identified one or more users. In at least some examples, revocation of access or permission to access includes access that was previously permitted (e.g., access to one or more applications by one or more users) and now, based on the determination that access should be revoked, will no longer be permitted.

Once an item has been analyzed by the item analysis module 310, if the item is, for example, associated with access, is actionable and is mapped to a confirmed location, the item may be transmitted to a revocation module 312. The revocation module 312 may automatically remove access or permission to access an identified one or more applications for the identified one or more users. Accordingly, the identified one or more users may be unable to access to the identified one or more applications via a computing device, such as computing devices 316a-316e. For instance, access to the identified one or more application may be prevented on a smartphone 316a, personal digital assistance (PDA) 316b, tablet computing device 316c, cell phone 316d, or other type of computing device 316e.

If the item being analyzed by the item analysis module 310 does not meet the criteria of the revocation settings, the item may be transmitted to a further processing module 314. In some examples, the further processing module 314 may direct the item to an administrator for manual processing, may redirect the item to another group or team within the entity 302 designated to handle those types of items, or the like.

In some examples, one or more modules within the access revocation system 300 may include tracking features in order to maintain a record or log of items received, analysis performed, determinations made, and the like. Accordingly, an audit trail may be established that may be used to track actions taken, confirm procedures and regulations are being followed, and the like.

These and various other arrangements will be discussed more fully below.

Figure 4:
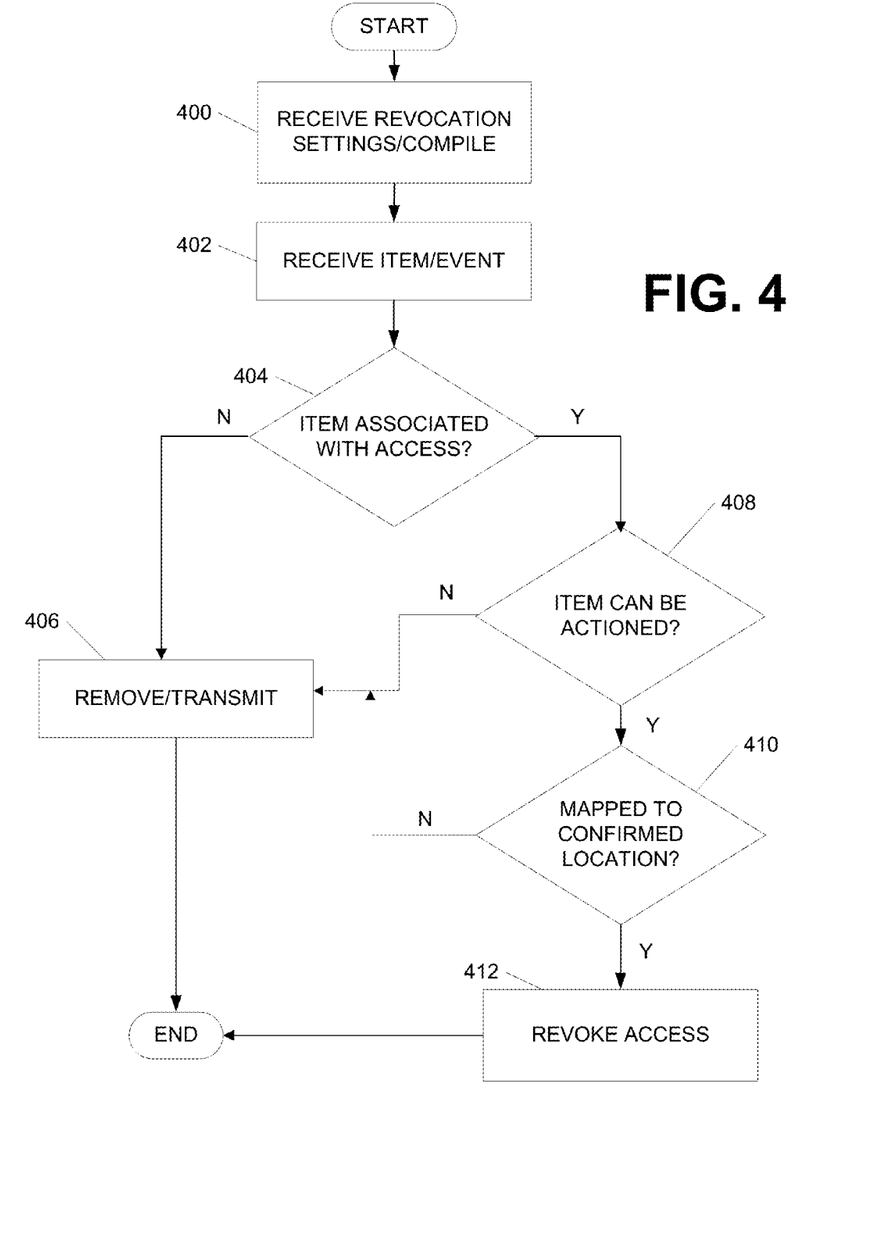
FIG. 4 is an example method of determining whether access to one or more applications for one or more users should be revoked, according to one or more aspects described herein.

FIG. 4 illustrates one example method of determining whether access to or permission to access one or more applications for one or more users should be revoked, according to one or more aspects described herein. In step 400, revocation settings may be received (e.g., by a revocation settings module 306. The revocation settings may be received from one or more different enterprises, business groups, business divisions, or the like, within an entity implementing the system (e.g., entity 302 in FIG. 3). The revocation settings may, in some examples, include best practices implemented by each of the different divisions, enterprises or business groups from which the settings are received. Accordingly, the received settings also may be compiled in step 400, in order to implement a standardized set of settings for revocation of access.

In step 402, an event or potential access revocation item is received. The event or item may, in some examples, including a plurality of events of items. The event or item may include one or more applications associated with the item, one or more users associated with the item, and the like. The event or item may be received by, for instance, an item analysis module (such as module 310 in FIG. 3) and may be analyzed or evaluated by the module, as is discussed more fully below. Although one item is discussed with respect to FIG. 4, a plurality of items may be received by the system and evaluated or analyzed using the processes described herein.

In step 404, a determination may be made as to whether the item is associated with access to or permission to access one or more applications. For instance, the system may determine whether the item received is associated with or related to revoking access to one or providing/revoking access to one or more applications. Performing this step at or near the beginning of an access revocation process may greatly reduce the amount of items being processed, evaluated, analyzed, or the like, by the system. This may aid in improving accuracy of revocation, reducing time elapsed between departure of an employee and revocation, and may improve efficiency for the process overall.

If, in step 404, a determination is made that the item is not associated with access to or permission to access one or more applications, the item may be removed from the process and/or transmitted for further processing in step 406. As discussed above, further processing may include manually analyzing or researching the received item, transferring the item to another business group, team or system associated with the other business group or team, designated to handle items of that nature, or the like.

If, in step 404, a determination is made that the item is associated with access to or permission to access one or more application, the process may proceed to step 408 where a determination is made as to whether the item can be actioned. For instance, step 408 may include determining whether the system is the appropriate system to handle the item, whether the item is an item that can be processed automatically via the system or whether additional action or processing may be desired, or the like. In another example, the item may be reviewed to determine whether it is related to compliance data or messages. For instance, data that indicates access a user does not have due to a category or group of users with which the user is associated. If, in step 408, it is determined that the item is not actionable, the item may be removed from the process and/or transmitted for further processing in step 406, similar to the arrangement discussed above.

If, in step 408, it is determined that the item is actionable, in step 410, a determination may be made as to whether the item is mapped to a confirmed location. As indicated above, mapping to a confirmed location may include mapping of an application reference number to, for instance, an access administrator, to a simplified sign-on (SSO) owner (e.g., for applications with web enabled access), a division or enterprise access management team, an access management team from a division or enterprise outside the division or enterprise related to the item, and/or the access administrator for profiled access.

If, in step 410, the item is not mapped to a confirmed location, the item may be removed from the process and/or transmitted for further processing in step 406, as discussed above. Alternatively, if, in step 410, the item is mapped to a confirmed location, the item may be further processed and access identified in that item may be revoked in step 412. In some examples, access to the one or more applications identified in the item for the one or more users identified in the item may be automatically revoked (e.g., without additional input or interaction with the system).

In some examples, some of the steps associated with the process illustrated in FIG. 4 may be performed in the order indicated in FIG. 4 and described above. For instance, determining whether an item relates to access may be performed as a first step in a filtering portion of the process, or at a point early in the process. This may aid in ensuring that any items not related to access or access revocation will be filtered out early in the process in order to reduce the number of items being evaluated by the system.

As discussed above, the process of analyzing and/or evaluating an item may include maintaining a record or the analysis performed in order to track the progress of the item through the system. Accordingly, analysis of the item, actions taken, and the like, may be tracked in order to maintain a record of processing the item, confirm that procedures are being followed, and the like.

Figure 5:
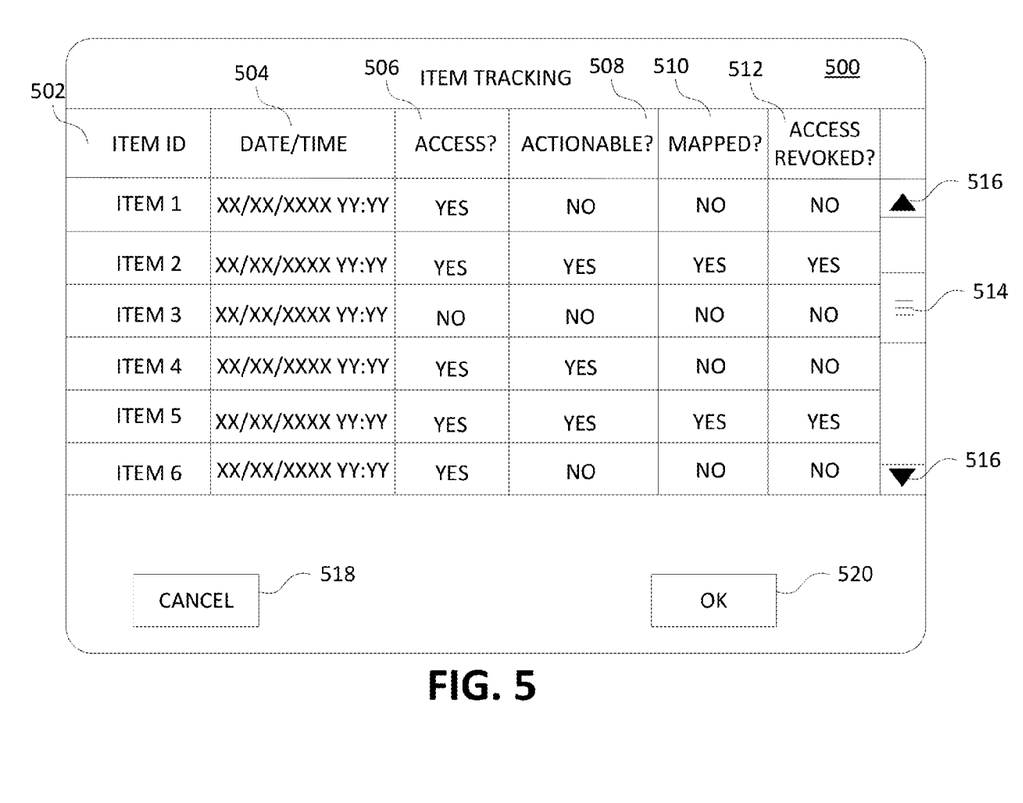
FIG. 5 is an example user interface that may display tracking information associated with analysis or evaluation of an item, according to one or more aspects described herein.

FIG. 5 illustrates one example user interface 500 that may display tracking information associated with analysis or evaluation of an item, according to one or more aspects described herein. In column 502, one or more items are displayed. The items are identified by an item number or other identifier. Column 504 includes a date and time associated with each item. The date and time may indicate when the item was received, when the item was analyzed or evaluated, and/or when the analysis of the item was completed. In some examples, an additional date and time column may be provided. In these arrangements, one date and time column may be used to identify a date and/or time that the item was received, while the second date and time column may indicate the date and time that analysis of the item was completed. Accordingly, a duration or processing time to complete the analysis of item may be provided or determined (e.g., based on the difference or time elapsed between the first column and the second column).

Column 506 indicates whether the identified item is associated with access (e.g., whether the identified item is associated with providing or revoking access associated with one or more applications for one or more users). As discussed above, as an item is analyzed or evaluated, the determination is made as to whether the item is related to access. That determination may be displayed in column 506 for tracking purposes.

Column 508 indicates whether the identified item is actionable (e.g., whether the identified item should be addressed by this particular system or team implementing the system, or the like). As discussed above, as an item is analyzed or evaluated, the determination is made as to whether the item is actionable. That determination may be displayed in column 508 for tracking purposes.

Column 510 indicates whether the identified item is mapped to a confirmed location. As discussed above, as an item is analyzed or evaluated, the determination is made as to whether an item is mapped to a confirmed location. That determination may be displayed in column 508 for tracking purposes.

Column 512 provides the ultimate outcome of the analysis of each item. For instance, column 512 may indicate whether analysis of the item resulted in revocation of access to one or more applications for one or more users.

In some examples, a user may activate scrolling of the user interface 500 in order to view additional items not displayed on the current portion of the display. Accordingly, the user may activate slider bar 514 or arrows 516 in order to scroll through additional items not shown in FIG. 5. The user may also select "CANCEL" option 518 if the user would like to return to a previous screen, or "OK" option 520 to advance to another user interface.

Figure 6:
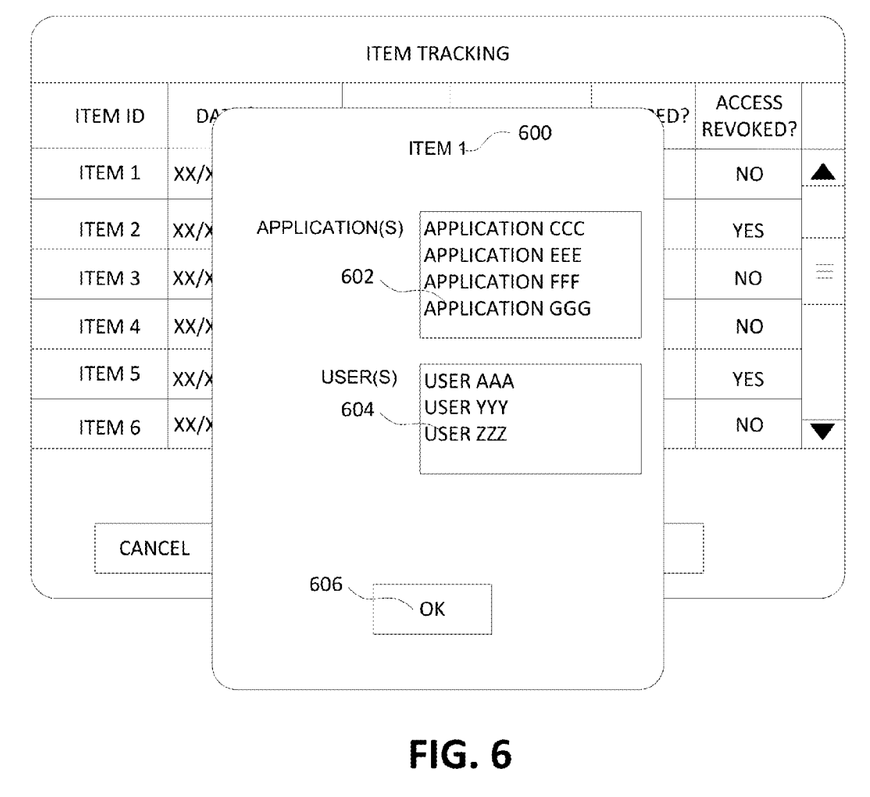
FIG. 6 is an example user interface providing additional details about a selected item according to one or more aspects described herein.

In some arrangements, selection of an item (or other piece of data associated with the item in, for instance, one of column 504-512) may prompt display of an additional user interface, such as interface 600 shown in FIG. 6. The user interface 600 may include additional details associated with the selected item. For instance, interface 600 may include the item identifier 602. Interface 600 may further include region 602 in which one or more applications related to the item are identified. The applications may be applications for which revocation of access is being evaluated.

Interface 600 may further include region 604 in which one or more users associated with the item are identified. The one or more users may be users for which revocation of access to the identified one or more applications is being considered or evaluated. Selection of "OK" option 606 may close user interface 600 and return the user to a previous user interface, such as interface 500.

Although interface 600 is shown as overlaying the interface 500, in some examples, interface 600 may be displayed without any portion of interface 500.

Further, the information provided in interfaces 500 and 600 are merely some examples of information that may be tracked and/or displayed. Various other pieces or types of information may be displayed or provided in one or more similar user interfaces without departing from the invention. For instance, employee number or other identifier, type of employee (e.g., contractor or employee), business group of the employee, type of application, and the like, may be provided in one or more interfaces similar to interfaces 500 or 600 without departing from the invention.

Additionally or alternatively, the example information shown in the user interface 500 of FIG. 5 may be sorted, filtered, or the like, according to desired criteria. For example, in order to simplify the data being reviewed, a user may elect to sort the data to display only items for which access was revoked. In another example, a user may elect to sort the data to display items having a "yes" entry in one or more of columns 506, 508 and/or 510. In still another example, a user may elect to hide one or more rows in order to simplify viewing of the data. Various other sorting and/or filtering arrangements may be used without departing from the invention.

The systems, methods, apparatuses, and the like described herein aid in improving accuracy and efficiency in revoking user access to one or more applications to which the user should no longer have access. By performing the steps of the methods described herein up front or at an early stage in the process, the number of items (e.g., amount of data) being evaluated and/or analyzed is greatly reduced. This may aid in improving speed of revocation (e.g., time between when a user's access should be revoked to when the revocation occurs). This can be an important factor in reducing risk associated with users (e.g., former employees, or the like) having access after termination of their employment.

Further, by reducing the amount of items to be processed for revocation (e.g., by implementing the filtering steps described herein) more accurate revocations can be made (e.g., inadvertently revoking access for users who should have access, or the like).

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   receive first revocation settings from a first enterprise division within a business entity;
   receive second revocation settings from a second enterprise within the business entity;

compile the first revocation settings and the second revocation settings to generate compiled revocation settings;
receive a first item associated with a revocation of access for a user within the business entity, the first item including identification of one or more applications for which revocation of access is being evaluated and identification of one or more users for which revocation of access is being evaluated;
analyze the first item based on the compiled revocation settings, the analyzing further including instructions that, when executed, cause the apparatus to:
determine, based on the compiled revocation settings, whether the first item is associated with providing access;
determine, based on the compiled revocation settings, whether the first item is actionable by the access revocation system; and
determine, based on the compiled revocation settings, whether the first item is mapped to a confirmed location; and
responsive to determining that the first item is associated with providing access, that the first item is actionable and that the first item is mapped to a confirmed location, revoke access to the one or more applications identified in the first item for the one or more users identified in the first item.

2. The apparatus of claim 1, further including instructions that, when executed, cause the apparatus to:
record an outcome of the steps of determining whether the first item is associated with providing access, determining whether the first item is actionable and determining whether the first item is mapped to a confirmed location.

3. The apparatus of claim 2, further including instructions that, when executed, cause the apparatus to:
store the recorded outcomes for further analysis.

4. The apparatus of claim 2, further including instructions that, when executed, cause the apparatus to:
display the recorded outcomes on a user interface tracking the analysis of the first item.

5. The apparatus of claim 1, further including instructions that, when executed, cause the apparatus to:
responsive to determining that the first item is not associated with providing access, remove the first item from further analysis including the steps of determining whether the first item is actionable and determining whether the first item is mapped to a confirmed location.

6. The apparatus of claim 5, wherein removing the first item from further analysis includes transferring the first item for further processing.

7. The apparatus of claim 1, wherein the first revocation settings are best practices of the first enterprise and the second revocation settings are best practices of the second enterprise.

8. A method, comprising:
receiving, by an access revocation system having at least one processor, first revocation settings from a first enterprise within a business entity;
receiving, by the access revocation system, second revocation settings from a second enterprise within the business entity;
compiling the first revocation settings and the second revocation settings to generate compiled revocation settings;
receiving, by the access revocation system, a first item associated with a revocation of access for a user within the business entity, the first item including identification of one or more applications for which revocation of access is being evaluated and identification of one or more users for which revocation of access is being evaluated;
analyzing the first item based on the compiled revocation settings, the analyzing including:
determining, based on the compiled revocation settings, whether the first item is associated with providing access;
determining, based on the compiled revocation settings, whether the first item is actionable by the access revocation system; and
determining, based on the compiled revocation settings, whether the first item is mapped to a confirmed location; and
responsive to determining that the first item is associated with providing access, that the first item is actionable and that the first item is mapped to a confirmed location, revoking access to the one or more applications identified in the first item for the one or more users identified in the first item.

9. The method of claim 8, further including, recording an outcome of the steps of determining whether the first item is associated with providing access, determining whether the first item is actionable and determining whether the first item is mapped to a confirmed location.

10. The method of claim 9, further including storing the recorded outcomes for further analysis.

11. The method of claim 9, displaying the recorded outcomes on a user interface tracking the analysis of the first item.

12. The method of claim 8, further including, responsive to determining that the first item is not associated with providing access, removing the first item from further analysis including the steps of determining whether the first item is actionable and determining whether the first item is mapped to a confirmed location.

13. The method of claim 12, wherein removing the first item from further analysis includes transferring the first item for further processing.

14. The method of claim 8, wherein the first revocation settings are best practices of the first enterprise and the second revocation settings are best practices of the second enterprise.

15. One or more non-transitory computer-readable media having computer-executable instructions stored thereon that, when executed, cause at least one computing device to:
receive first revocation settings from a first enterprise within a business entity;
receive second revocation settings from a second enterprise within the business entity;
compile the first revocation settings and the second revocation settings to generate compiled revocation settings;
receive a first item associated with a revocation of access for a user within the business entity, the first item including identification of one or more applications for which revocation of access is being evaluated and identification of one or more users for which revocation of access is being evaluated;
analyze the first item based on the compiled revocation settings, the analyzing further including instructions that, when executed, cause the apparatus to:
determine, based on the compiled revocation settings, whether the first item is associated with providing access;
determine, based on the compiled revocation settings, whether the first item is actionable by the access revocation system; and determine, based on the compiled revocation settings, whether the first item is mapped to a confirmed location; and responsive to determining that the first item is associated with providing access, that the first item is actionable and that the first item is mapped to a confirmed location, revoke access to the one or more applications identified in the first item for the one or more users identified in the first item.

16. The one or more non-transitory computer-readable media of claim 15, further including instructions that, when executed, cause the at least one computing device to:

record an outcome of the steps of determining whether the first item is associated with providing access, determining whether the first item is actionable and determining whether the first item is mapped to a confirmed location.

17. The one or more non-transitory computer-readable media of claim 16, further including instructions that, when executed, cause the at least one computing device to:

display the recorded outcomes on a user interface tracking the analysis of the first item.

18. The one or more non-transitory computer-readable media of claim 15, further including instructions that, when executed, cause the at least one computing device to:

responsive to determining that the first item is not associated with providing access, remove the first item from further analysis including the steps of determining whether the first item is actionable and determining whether the first item is mapped to a confirmed location.

19. The one or more non-transitory computer-readable media of claim 18, wherein removing the first item from further analysis includes transferring the first item for further processing.

20. The one or more non-transitory computer-readable media of claim 15, wherein the first revocation settings are best practices of the first enterprise and the second revocation settings are best practices of the second enterprise.

\* \* \* \* \*